United States Patent Office 3,562,213
Patented Feb. 9, 1971

3,562,213
LATENT CURE ACCELERATION OF EPOXY RESINS USING IMIDAZOLE SALTS OF HYDROXY POLYCARBOXYLIC ACIDS
Michael J. Collis, Teddington, England, assignor to Shell Oil Company, New York, N.Y., a corporation of Delaware
No Drawing. Filed May 8, 1968, Ser. No. 727,679
Claims priority, application Great Britain, May 8, 1967, 21,212
Int. Cl. C08g 17/017
U.S. Cl. 260—47     7 Claims

ABSTRACT OF THE DISCLOSURE

Room temperature-stable epoxy resin mixtures are disclosed. These mixtures comprise a polyepoxide, a polycarboxylic acid anhydride and a curing catalyst which is a salt of an imidazole compound and an organic hydroxy polycarboxylic acid containing at least one asymmetric carbon atom. A process for preparing resinified products from such mixtures is also disclosed.

BACKGROUND OF THE INVENTION

Polyepoxides are used in many applications in the electrical industry. One such application is the use of a polyepoxide composition in forming heat-resistant, void-filling coatings on electrical conductors in coil or like form, for example, armatures, rotors and stator field windings, the composition being applied by immersing the coil or other piece of electrical equipment in a liquid bath comprising the polyepoxide composition, withdrawing the equipment after adequate penetration of the composition within the interstices thereof has occurred, and thereafter subjecting the equipment to elevated temperature conditions to effect curing of the polyepoxide. The liquid bath may comprise an appreciable body of epoxy resin composition; for example, amounts of the order of 1 ton are not uncommon in the heavy current side of the electrical industry in view of the size of the electrical equipment involved. Normally, the bath is maintained at ambient or slightly elevated temperature, for example, 30 to 60° C. and curing is effected at an appreciably higher temperature. The polyepoxides used in said application are resins of low hydroxyl content which have to be specially prepared for the purpose and consequently there is a need in the art for a polyepoxide composition based on readily available polyepoxides which can be used in place of the special polyepoxides hitherto required.

SUMMARY OF THE INVENTION

The present invention provides a polyepoxide composition which is stable at room temperature and has an acceptable pot-life at 30–60° C. and is readily curable at elevated temperatures to give products having excellent plysical and electrical properties. These compositions comprise a polyepoxide having on an average more than one vic-epoxy group per molecule, a polycarboxylic acid anhydride, and a curing catalyst which is a salt of an imidazole compound and an organic hydroxy polycarboxylic acid containing at least one asymmetric carbon atom.

DESCRIPTION OF THE PRIOR ART

U.S. 3,329,652 describes a process for curing polyepoxides with polycarboxylic acid anhydrides in the presence of certain imidazole salts. These salts, when mixed with the polyepoxide and the polycarboxylic acid anhydride, give mixtures which are not room-stable and have an unsatisfactory pot-life at 30 to 60° C.

DESCRIPTION OF THE PREFERRED EMBODIMENT

Polyepoxide.—The polyepoxides used in the compositions of the present invention are those possessing more than one vic-epoxy group, i.e., more than one

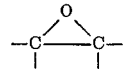

group; which group may be a terminal group, i.e.,

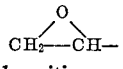

or may be in an internal position.

The polyepoxides may be saturated or unsaturated, aliphatic, cycloaliphatic, aromatic, or heterocyclic and may be substituted with substituents, such as chlorine, hydroxyl group, ether radical and the like.

Examples of such polyepoxides include, among others,
1,4-bis(2,3-epoxypropoxy)benzene,
1,3-bis(2,3-epoxypropoxy)benzene,
4,4′-bis(2,3-epoxypropoxy)diphenyl ether,
1,8-bis(2,3-epoxypropoxy)octane,
1,4-bis(2,3-epoxypropoxy)cyclohexane,
4,4′-bis(2-hydroxy-3,4′-epoxybutoxy)diphenyl dimethylmethane,
1,3-bis(4,5-epoxypentoxy)-5-chlorobenzene,
1,4-bis(3-4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bisphenol A), 2,2-bis(4-hydroxyphenol)butane, 4,4′-dihydroxybenzophenone, bis-(4-hydroxyphenyl)ethane, 2,2-bis(4-hydroxyphenyl)pentane and 1,5-dihydroxynaphthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and these are designated Polyethers A, B, C, and D.

Another group of polyepoxides comprises the polyepoxy polyethers obtained by reacting, preferably in the presence of an acid-acting compound, such as hydrofluoric acid, or of the aforedescribed halogen-containing epoxides such as epichlorohydrin, with a polyhydric alcohol, and subsequently treating the resulting product with an alkaline component. As used herein, the expression "polyhydric alcohol" is meant to include those compounds having at least two free alcoholic OH groups and includes the polyhydric alcohols and their ethers and esters, hydroxyaldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, poyvinyl alcohol, inositol, trimethylolpropane, bis(4-hydroxycyclohexyl)dimethylmethane and the like.

The preparation of suitable polyepoxide polyethers is illustrated in U.S. 2,733,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 30 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3 - epoxybutyl)adipate, di(2,3 - epoxybutyl) oxalate, di(2,3-epoxyhexyl)succinate, di(2,3-epoxyoctyl) tetrahydrophthalate, di(4,5-epoxydodecyl)maleate, di-(2,3-epoxybutyl)terephthalate, di(2,3 - epoxypentyl)thiopropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups includes epoxidized esters of unsaturated alcohols and unsaturated carboxylic acids, such as 2,3-epoxybutyl, 3,4-epoxypentanoate; 3,4-epoxyhexyl 3,4 - epoxypentanoate; 3,4-epoxycyclohexyl 3,4-cyclohexanoate; 2,3-epoxycyclohexylmethyl 2,3 - epoxycyclohexanoate; and 3,4-epoxycyclohexyl 4,5-epoxyoctanoate, 3,4-epoxycyclohexyl methyl epoxycyclohexane carboxylate, and the like.

Another group of materials having internal epoxy groups includes epoxidized esters of unsaturated monocarboxylic acids and polyhydric alcohols, such as ethylene glycol di(2,3 - epoxycyclohexanoate), glycerol tri(2,3-epoxycyclohexanoate) and pentanediol di(2,3 - epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene-styrene copolymers and the like.

Still another group includes the epoxidized hydrocarbons, such as epoxidized 2,3-bis(cyclohexenyl)propane; 2,2-bis(cyclohexenyl)butane and the like.

POLYCARBOXYLIC ACID ANHYDRIDES

The polycarboxylic acid anhydrides used may be any anhydride which is derived from a carboxylic acid and possesses at least one anhydride group, i.e., a

group. The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3,6-endomethylene 1,2-tetrahydrophthalic anhydride (chlorendic anhydride), succinic anhydride, maleic anhydride, chlorosuccinic anhydride, monochloromaleic anhydride, 6-ethyl-4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene (Nadic Methyl Anhydride), 3-methoxy-1,2,3,6-tetrahydrophthalic acid anhydride, 3-butoxy-1,2,3,6-tetrahydrophthalic anhydride, trimellitic anhydride, pyromellitic dianhydride, di-, tetra- and hexahydropyromellitic anhydride, polyadipic acid anhydride, polysebacic acid anhydride, and the like and mixtures thereof. Derivatives of the anhydrides, such as their partial esters, amides, etc., may also be employed. Examples of these include, for example, esters of glycols and pyromellitic anhydride and partial esters of trimellitic anhydride.

Preferred anhydrides to be employed in the process comprise the normally liquid or low melting anhydrides, such as hexahydrophthalic anhydride.

THE CURING CATALYST

The curing catalyst is a salt of an imidazole compound and an organic hydroxy polycarboxylic acid containing at lease one asymmetric carbon atom. Suitable imidazole compounds include those of the formulae:

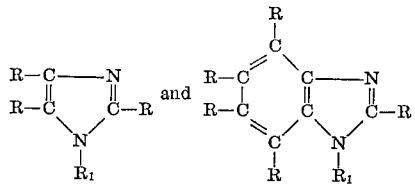

wherein R is hydrogen, halogen or an organic radical and $R_1$ is hydrogen or an organic radical, such as a hydrocarbon radical or a substituted hydrocarbon radical, for example, an ester, ether, amide, amino halogen or mercapto-substituted hydrocarbon radical. Especially preferred are the imidazoles wherein R is hydrogen or a hydrocarbon radical, and preferably an alkyl, alkenyl, cycloakyl, cycloalkenyl, aryl, alkaryl, or arylalkyl radical and particularly those containing no more than 15 carbon atoms. Even more preferred are imidazoles wherein $R_1$ is an organic radical. Examples of such compounds include, among others, imidazole, 2-methyl imidazole, 2-ethyl-4- methyl imidazole, 2,4-dioctyl imidazole, N-ethyl imidazole, N-butyl imidazole, N-butyl-2-ethyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole, and N-benzyl-2-methylimidazole and mixtures thereof.

The acid part of the salt is an organic hydroxy polycarboxylic acid containing at least one asymmetric carbon atom, i.e., a carbon atom carrying four different atoms or groups. Preferred acids are saturated aliphatic dicarboxylic hydroxy acids containing no more than ten carbon atoms and no more than four hydroxyl groups. The acids may be in the optically active forms or as an optically inactive racemic mixture or in the optically inactive meso form, the latter case applying if the acids contain an even number of similar asymmetric carbon atoms and no other asymmetric carbon atoms. Suitable acids include d-tararic acid, l-tartaric acid, dl-tartaric acid, i-tartaric acid, d-malic acid, l-malic acid, dl-malic acid, the chloromalic acids, the amino malic acids and the 2,4-dihydroxy glutaric acids. Particularly preferred are the optically active tartaric acids.

The salts may conveniently be prepared by mixing the imidazole compound and the hydroxy polycarboxylic acid in approximately chemical equivalent amounts at ambient or slightly elevated temperatures.

Examples of suitable salts to be employed in the compositions of the present invention are: N-benzyl imidazole-1-tartrate; N-cyclohexyl imidazole-d-tartrate; racemic N-octyl imidazole tartrate; N-butyl imidazole d-tartrate; 2-methyl imidazole-d-tartrate; 2-methyl imidazole-1-tartrate; imidazole-d-tartrate; imidazole-1-tartrate, and the corresponding salts of malic acid, chloromalic acid, amino malic acid and 2,4-dihydroxy glutaric acid.

The amount of polycarboxylic acid anhydride to be used in the compositions of the present invention may vary over a wide range. Good results are obtained reacting the polyepoxide with at least 0.5 equivalent of the anhydride. As used herein in relation to the amounts of anhydride and polyepoxide, the expression "equivalent" amount refers to that amount of anhydride needed to furnish one anhydride group for every epoxy group in the polyepoxide. to obtain the best results, the polyepoxide and the anhydride should be employed in an equivalent ratio of 1:1 to 1.2:1 of epoxy to anhydride.

The curing catalyst is needed only in small amounts. Excellent results are obtained when the catalyst is utilized in amounts varying from 0.02 to 5.0 parts by weight, and more preferably from 0.04 to 1.0 part by weight per 100 parts by weight of the polyepoxide.

In preparing the compositions of the present invention, it is desirable to have the polyepoxide in a mobile liquid condition when the anhydride or catalyst is added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride and catalyst by evaporation before or during the curing, such as esters like ethyl acetate, butyl acetate, Cellosolve acetate (acetate of ethylene glycol monoethyl ether), methyl Cellosolve acetate (acetate of ethylene glycol monoethyl ether), etc.; chlorinated hydrocarbons such as trichloropropane, chloroform, etc. and ether alcohols such as methyl, ethyl or butyl ether of ethylene glycol or diethylene glycol. These solvents may be used in admixture with aromatic hydrocarbons such as benzene, toluene, xylene, etc. and/or alcohols such as ethyl, isopropyl or n-butyl alcohol. Solvents which remain in the cured composition may also be used, such as diethyl phthalate, dibutyl phthalate, or liquid monoepoxide and polyepoxide compounds, including glycidyl allyl ether, glycidyl phenyl ether, styrene oxide, 1,2-hexylene oxide, (3,4 - epoxycyclohexyl) - methyl - 3,4 - epoxycyclohexanecarboxylate and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide composition including pigments, fillers, sand, rock, resin particles, graphite, asbestos, glass or metal oxide fibers, stabilizers, asphalts, tars, fungicides, insecticides, anti-oxidants, dyes, plasticizers and the like.

The cure is accomplished by heating the composition to elevated temperatures. Excellent rates of cure are obtained at temperatures above 60° C. and preferably above 120° C.

The polyepoxide-anhydride-catalyst compositions described above may be utilized for a variety of applications.

They may be used, for example, in the preparation of electrical pottings and castings, in the preparation of molding systems, and as surface coatings for various types of surfaces.

Excellent results are obtained when the compositions are used for coating electrical equipment. This may be accomplished by immersing said equipment in a body containing a composition according to the invention, which composition is in the liquid state and preferably has a viscosity not exceeding 3 poises at 30 to 40° C., subjecting said equipment, after removal from the body of liquid composition, to a temperature of at least 120° C. to effect curing of the polyepoxide in the composition deposited on the equipment.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise indicated, parts described in the examples are parts by weight.

Example I 124.2 parts of N-butyl imidazole were added slowly with stirring to a cooled solution of 75.0 parts of d-tartaric acid in 300 parts by volume of absolute ethanol, the rate of addition of the N-butylimidazole being such that the temperature of the reaction mixture did not exceed 29° C. The ethanol was stripped off under vacuum (0.1 millimeter of mercury pressure) and N-butylimidazole d-tartrate was obtained as a colorless viscous liquid which solidified on standing.

A 1:1 weight blend of diglycidylether of 2,2-bis(4-hydroxyphenyl) propane having an epoxide equivalent of 190 and an average molecular weight of 370, and (3,4-epoxycyclohexyl) - methyl, 3,4 epoxycyclohexane carboxylate was mixed with N-butylimidazole d-tartrate and nadic methyl anhydride to give a polyepoxide composition containing 0.073 part of the tartrate and 110 parts of the anhydride per hundred parts of polyepoxide. The composition had a pot life of 8 days at 60° C. and when cured for 16 hours at 140° C. it gave a hard resin of excellent physical and electrical properties. The pot life was determined by measuring the time taken for the composition to reach a viscosity of 1000 poises at 60° C. A normal ⅛″ thick casting made from this composition and cured as stated had a heat distortion temperature of 144° C.

In contrast, a number of similar polyepoxide compositions prepared using the N-butylimidazole salts of a number of other organic acids, which salts were added in the same molar proportions as the N-butylimidazole d-tartrate, either had unsatisfactory pot life at 60° C. or gave resins having unacceptable physical or electrical properties when cured under the stated conditions or suffered from both of these disadvantages; the salts investigated did include the lactate, acetate, n-propionate, n-valerate, n-octoate, 2-ethyl hexoate, laurate, and salicylate salts.

Example II

Example I was repeated with the exception that N-benzyl-2-methyl imidazole-d-tartrate was used as the curing catalyst. Related results were obtained.

Example III

Example I was repeated with the exception that N-benzyl-2-methyl imidazole-l-tartrate was used as the curing catalyst. Related results were obtained.

I claim as my invention:

1. A room temperature-stable composition comprising (1) a polyepoxide having more than one vic-epoxy group, (2) a polycarboxylic acid anhydride, and (3) a salt of an imidazole compound of the formula

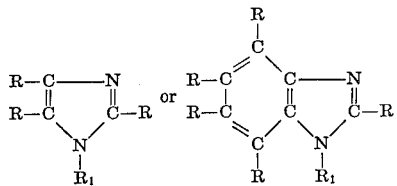

wherein R is hydrogen, halogen or a hydrocarbon radical, and $R_1$ is hydrogen or a hydrocarbon radical, and a saturated aliphatic dicarboxylic hydroxy acid containing no more than ten carbon atoms and no more than four hydroxyl groups.

2. A composition according to claim 1, wherein the polyepoxide is a glycidyl polyether of a dihydric phenol.

3. A composition according to claim 1 wherein the saturated aliphatic dicarboxylic hydroxy acid is optically active.

4. A composition according to claim 1 wherein the saturated aliphatic dicarboxylic hydroxy is a tartaric acid.

5. A composition according to claim 1 wherein the polycarboxylic acid anhydride is methyl-3,6-endomethylene-4-tetrahydrophthalic anhydride.

6. A room temperature-stable composition comprising (1) a polyepoxide having more than one vic-epoxy group, (2) a polycarboxylic acid anhydride in an amount between 0.5 and 1.1 mol per epoxy equivalent, and (3) from 0.02 to 5.0 parts by weight per 100 parts by weight of the polyepoxide of a salt of an N-alkyl substituted imidazole compound and a tartaric acid.

7. A precatalyzed epoxy composition consisting essentially of a polyepoxide having more than one vic-epoxy group, and a catalytic amount of a salt of an imidazole compound of the formula

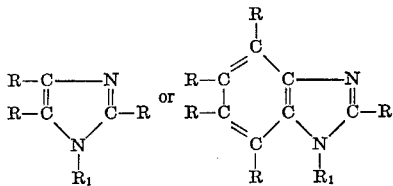

wherein R is hydrogen, halogen or a hydrocarbon radical, and $R_1$ is hydrogen or a hydrocarbon radical, and a saturated dicarboxylic hydroxy acid containing no more than ten carbon atoms and no more than four hydroxyl groups.

References Cited

UNITED STATES PATENTS

| | | | |
|---|---|---|---|
| 3,329,652 | 7/1967 | Christie | 260—47 |
| 2,569,920 | 10/1951 | Buck et al. | 117—124 |
| 3,438,937 | 4/1969 | Christie | 260—47 |

HAROLD D. ANDERSON, Primary Examiner

E. A. NEILSEN, Assistant Examiner

U.S. Cl. X.R.

260—2, 78.3